United States Patent
McGowan et al.

(10) Patent No.: US 9,287,620 B2
(45) Date of Patent: Mar. 15, 2016

(54) DETERMINATION OF AN IMPAIRMENT COMPENSATION MATRIX FOR AN ANTENNA ARRAY

(71) Applicant: Optis Cellular Technology, LLC, Plano, TX (US)

(72) Inventors: Neil McGowan, Stittsville (CA); Marthinus W. Da Silveira, Ottawa (CA); Bo Goransson, Sollentuna (SE); Peter Deane, Fitzroy Harbour (CA)

(73) Assignee: Optics Cellular Technology, LLC, Plano, TX (US)

( * ) Notice: Subject to any disclaimer, the term of this patent is extended or adjusted under 35 U.S.C. 154(b) by 484 days.

(21) Appl. No.: 13/765,046

(22) Filed: Feb. 12, 2013

(65) Prior Publication Data
US 2013/0207843 A1 Aug. 15, 2013

Related U.S. Application Data

(60) Provisional application No. 61/597,903, filed on Feb. 13, 2012.

(51) Int. Cl.
*H01Q 3/40* (2006.01)
*H04B 17/12* (2015.01)

(52) U.S. Cl.
CPC . *H01Q 3/40* (2013.01); *H04B 17/12* (2015.01)

(58) Field of Classification Search
CPC .......... H01Q 3/267; H01Q 3/40; H01Q 25/00
USPC ............ 342/81, 157, 368, 372, 373; 375/133, 375/134; 455/129, 562.1
See application file for complete search history.

(56) References Cited

U.S. PATENT DOCUMENTS

| | | |
|---|---|---|
| 2006/0128436 A1 | 6/2006 | Doi et al. |
| 2007/0183479 A1 | 8/2007 | Noll et al. |

FOREIGN PATENT DOCUMENTS

WO 2012038783 A1 3/2012

OTHER PUBLICATIONS

International Search Report and Written Opinion for PCT/IB2013/051146, mailed Jul. 30, 2013, 13 pages.

*Primary Examiner* — Dao Phan

(57) ABSTRACT

Determination of an impairment compensation matrix for compensation of impairments in an antenna array is disclosed. A plurality of different combinations of multi-signal transmissions which form at least one null at a respective location of a plurality of locations is determined. Each combination includes a multi-signal transmission that comprises at least two concurrent signal transmissions from at least two antenna subarrays of N antenna subarrays and the respective location. Based on signal characteristics associated with the plurality of different combinations of multi-signal transmissions and an expected signal reception at the plurality of locations, an impairment matrix that identifies an effect of impairments among the N antenna subarrays is determined. The impairment compensation matrix is determined based on the impairment matrix.

21 Claims, 13 Drawing Sheets

DETERMINATION OF AN IMPAIRMENT COMPENSATION MATRIX FOR AN ANTENNA ARRAY

RELATED APPLICATIONS

This application claims the benefit of provisional patent application Ser. No. 61/597,903, filed Feb. 13, 2012, the disclosure of which is hereby incorporated herein by reference in its entirety.

TECHNICAL FIELD

The embodiments relate generally to wireless communications, and in particular to the determination of an impairment compensation matrix that compensates for antenna impairments, such as mutual coupling among the antenna subarrays of an antenna array.

BACKGROUND

Advanced wireless communication systems, such as multiple-input multiple-output (MIMO) communication systems, increasingly rely upon concurrent signal transmissions from multiple antenna subarrays of an antenna array to form desired radiation patterns. An antenna subarray may be made of one or more antenna elements. Theoretically, by altering the signal characteristics of concurrently transmitted signals, such as by altering the phase or magnitude of the concurrently transmitted signals, one or both of lobes and nulls may be formed in desired locations. On transmission, radiation pattern lobes are desirable to focus energy at a location of a receiver, and nulls are desirable to reduce the interference seen by other receivers. When receiving, a lobe can increase the signal strength of a desired transmitter, and a null may eliminate interference from a non-desirable transmitter.

Multiple real-world factors, referred to herein as antenna impairments, may affect the ideal, or theoretical, transmission characteristics of an antenna array. Such impairments may include, but are not limited to, differences in the signal paths between the transmitters and the antenna subarrays of the antenna array, mutual coupling between antenna subarrays, ground plane imperfections, mechanical tolerance differences, differences in radio equipment hardware, and the like. Impairments alter the ideal, or theoretical, antenna radiation pattern characteristics and therefore affect the ability to accurately place a lobe or null where desired. Such impairments may result in lower system throughput.

Substantial efforts are often put into antenna design to eliminate or minimize some impairments, such as mutual coupling between antenna subarrays. This increases the design cost and extends the design time of an antenna array. Frequently, design changes that are implemented to avoid impairments, such as mutual coupling, result in performance tradeoffs. Alternatively, the effects of mutual coupling may simply be ignored, resulting in non-ideal radiation patterns. As wireless bandwidth and system throughput becomes increasingly valuable, it becomes increasingly important to accurately form radiation patterns as desired.

SUMMARY

The embodiments relate to the determination of an impairment compensation matrix that compensates for antenna impairments associated with an antenna array that has multiple antenna subarrays. The impairment compensation matrix includes compensation terms, or compensation elements, that may be applied to signals in a pre-processing phase prior to transmission by the antenna subarrays. The pre-processing phase alters the signals in accordance with the compensation elements to reduce or eliminate the effects of the antenna impairments, facilitating the generation of accurate and desirable radiation patterns.

Generally, the embodiments relate to the determination of an impairment compensation matrix for compensation of impairments in an antenna array that includes N antenna subarrays. An antenna subarray comprises one or more antenna elements that each receive the same signal for transmission. In one embodiment, each antenna element in the antenna subarray may be coupled to the same antenna port.

A plurality of different combinations of multi-signal transmissions that form at least one null at a location of a plurality of locations is determined. Each combination includes a multi-signal transmission that includes at least two concurrent signal transmissions from at least two antenna subarrays of the N antenna subarrays, and the location at which the at least one null was formed. The at least two concurrent signal transmissions have associated signal characteristics.

Based on the signal characteristics associated with the plurality of different combinations of multi-signal transmissions and an expected signal reception at the plurality of locations, an impairment matrix that identifies an effect of impairments among the N antenna subarrays is determined. The impairment compensation matrix is then determined based on the impairment matrix.

The expected signal reception at the locations may be defined by an antenna matrix that identifies expected signal transfer between each antenna subarray, and an antenna at each location.

In one embodiment, the impairment matrix that identifies the effect of impairments is determined by deriving a linear equation for each different combination. Each linear equation includes signal elements that identify a particular magnitude and a particular phase associated with each signal transmission of the at least two concurrent signal transmissions, propagation elements that identify the expected signal reception between each of the at least two antenna subarrays and an antenna at the respective location, and impairment variables that represent unknown impairment elements.

A plurality of independent linear equations may be derived based on the plurality of different combinations, and the impairment variables are solved, for example, using a least mean square function. Each impairment variable is an element in the impairment matrix. An inverse, or a pseudo-inverse, of the impairment matrix may be taken to determine the impairment compensation matrix.

The locations at which nulls are formed may be determined by receivers located within a signal reception area of the antenna array. In one embodiment, the location of a null may be defined in terms of a direction relative to a boresight of the antenna array. In one embodiment, the receivers may comprise mobile devices. In such embodiment, for each different combination, a block of information may be sent to a mobile device, the block of information including a first reference signal generated by a single antenna subarray of the at least two antenna subarrays and a second reference signal generated by the concurrent transmission of the at least two antenna subarrays. The mobile device may receive the first reference signal and not receive the second reference signal, and provide signal information indicating the receipt of the first reference signal and the failure to receive the second reference signal. The transmitter receives the signal information that indicates the at least two concurrent signal transmissions form a null at the location. The mobile device may be requested to provide a location of the mobile device, and the location of the mobile device is identified as the location at which a null has been formed.

In another embodiment, a method for determining an impairment compensation matrix includes initiating a plurality of multi-signal transmissions from subsets of N antenna subarrays of an antenna array. Each multi-signal transmission includes a concurrent transmission of a signal from each antenna subarray in a particular subset, and each signal has signal characteristics comprising at least a particular magnitude and phase. A plurality of locations within a signal reception area of the antenna array wherein a null is formed during at least some of the plurality of multi-signal transmissions is determined. Based on the signal characteristics of the multi-signal transmissions and an expected signal reception at the plurality of locations, an impairment matrix that identifies an effect of impairments among the N antenna subarrays is determined. The impairment compensation matrix is determined based on the impairment matrix.

In another embodiment, a method for determining an impairment compensation matrix for compensation of impairments in an antenna array that includes determining a plurality of different null-forming multi-signal transmissions is provided. Each null-forming multi-signal transmission includes concurrent signal transmissions from at least two antenna subarrays of the N antenna subarrays that form a null at a location of a plurality of locations. Based on signal characteristics associated with the plurality of different null-forming multi-signal transmissions and an expected signal reception at the plurality of locations, an impairment matrix that identifies an effect of impairments among the N antenna subarrays is determined. The impairment compensation matrix is determined based on the impairment matrix.

Another embodiment includes a device that has a plurality of antenna ports. Each antenna port is configured to communicate with an antenna subarray of an antenna array. The device includes a controller that is communicatively coupled to the plurality of antenna ports. The controller is configured to determine a plurality of different combinations of multi-signal transmissions which form at least one null at a location of a plurality of locations. Each combination includes a multi-signal transmission that includes at least two concurrent signal transmissions from at least two antenna subarrays of the N antenna subarrays and the location where a null has been formed. Each of the at least two concurrent signal transmissions having associated signal characteristics. Based on the signal characteristics associated with the plurality of different combinations of multi-signal transmissions and an expected signal reception at the plurality of locations, an impairment matrix that identifies an effect of impairments among the N antenna subarrays is determined. The impairment compensation matrix is determined based on the impairment matrix.

Among other advantages, the embodiments disclosed herein may increase system throughput by facilitating the formation of lobes and nulls where desired, and simplify and reduce the design time of antenna arrays. The embodiments may also provide greater freedom in the choice of antenna element design to better optimize attributes such as cost, manufacturability, and repeatability of antenna arrays. The embodiments permit both antenna array calibration and other impairments, such as mutual coupling, to be compensated in a single process.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
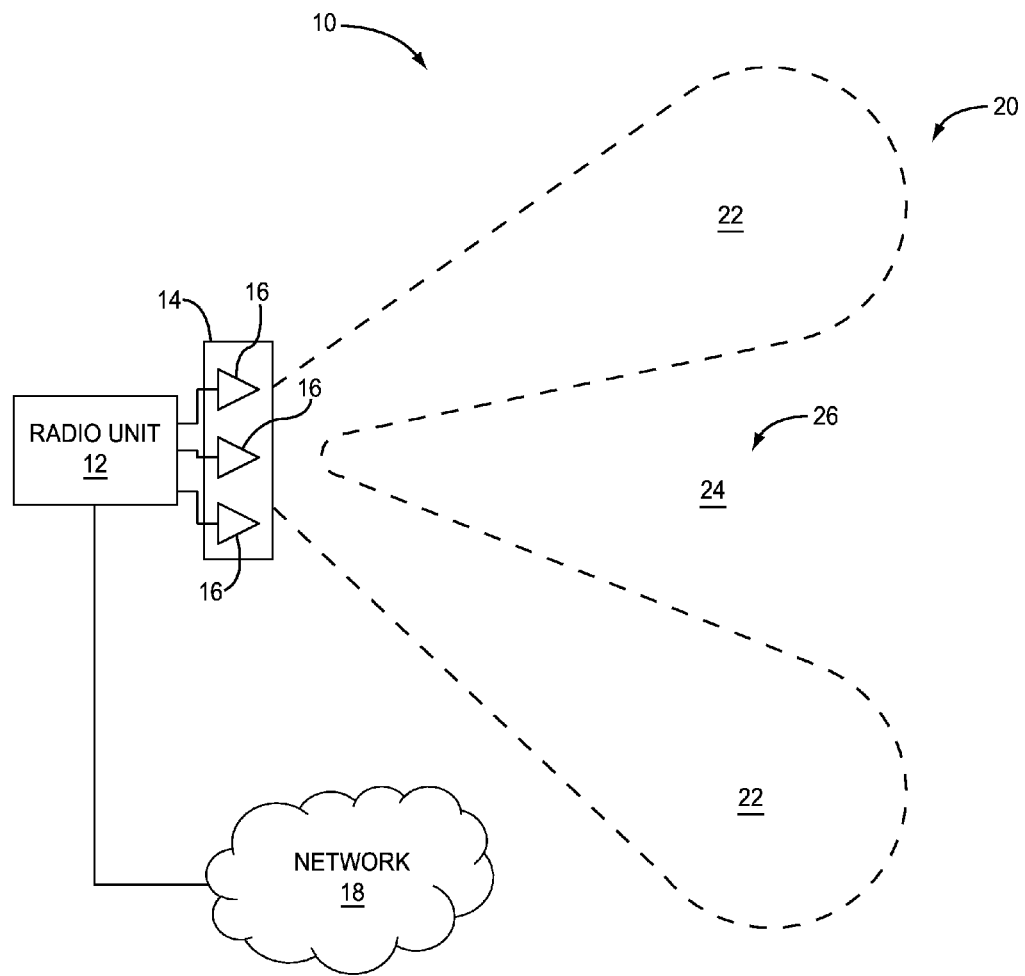
FIG. 1 is a block diagram of a system in which embodiments may be practiced.

Before delving into the details of the embodiments, context of the environment in which the embodiments may be practiced will be provided. FIG. 1 is a block diagram of a system 10 in which embodiments may be practiced. The system 10 includes a radio unit 12 that is coupled to an antenna array 14. The radio unit 12 may comprise any processing or computing device capable of generating and providing a signal to the antenna array 14 for transmission. By way of non-limiting example, the radio unit 12 may comprise a base station, such as a wireless access point (WAP), or an Evolved Universal Terrestrial Radio Access Network (E-UTRAN) Node B (eNodeB) base station.

The antenna array 14 comprises multiple antenna subarrays 16. Each antenna subarray 16 comprises one or more antenna elements configured to radiate energy into free space. An antenna subarray 16 may comprise any number of antenna elements irrespective of the configuration of the antenna elements. Typically, the antenna elements of a respective antenna subarray 16 receive the same signal for transmission. In one embodiment, the antenna elements in an antenna subarray 16 are coupled to a same antenna port. In some embodiments, each antenna subarray 16 comprises a column of antenna elements. Frequently, antenna subarrays 16 are placed within a certain distance of one another, such as approximately one half the wavelength of the frequencies radiated by the antenna array 14, but the embodiments recited herein are not limited to any particular spacing.

The radio unit 12 is coupled to a network 18 that represents one or more other devices, such as other radio units 12 or downstream networks such as the Internet. The radio unit 12 may receive data from the network 18 for transmission via the antenna array 14, and may receive data via the antenna array 14 for communication to a device via the network 18.

By transmitting signals concurrently from multiple antenna subarrays 16 of the antenna array 14, the radio unit 12 may radiate energy in a desired radiation pattern 20. The radiation pattern 20 may include one or more lobes 22 and one or more nulls 24. A lobe 22 represents energy radiated by the antenna array 14, and a null 24 represents a lack of energy at a location 26.

The location 26, when in the near field, may be defined in terms of an azimuth angle relative to a boresight of the antenna array 14 and a distance, and when in the far field may be defined in terms of solely an azimuth angle relative to the boresight of the antenna array 14. In some embodiments, the location 26 could be determined in the vertical domain and then characterized by elevation angle. Thus, references herein to a location where a null is formed, such as the location 26, are not limited to a single discrete location, but may include an area or volume along the azimuth angle with respect to the boresight of the antenna array 14. Generally, the null 24 comprises an insubstantial amount or complete lack of energy with respect to the energy radiated in the lobe 22 formed at the same time as the null 24.

The radio unit 12 may form lobes 22 and nulls 24 by altering signal characteristics of the signals being transmitted from the antenna subarrays 16. In particular, signal characteristics, such as magnitude and phase, may be altered such that concurrent signal transmissions via the antenna subarrays 16 form the desired radiation pattern 20. The signal characteristics, in some embodiments, may be quantified via a complex coefficient. For example, it may be desirable to form a lobe 22 in a location of a receiver, such as a mobile device (not illustrated). It may also be desirable to form a null 24 in a location of a neighboring radio unit 12 to reduce the interference seen by the neighboring radio unit 12. Thus, an ability to accurately form the radiation pattern 20 increases system throughput of the system 10.

Figure 2:
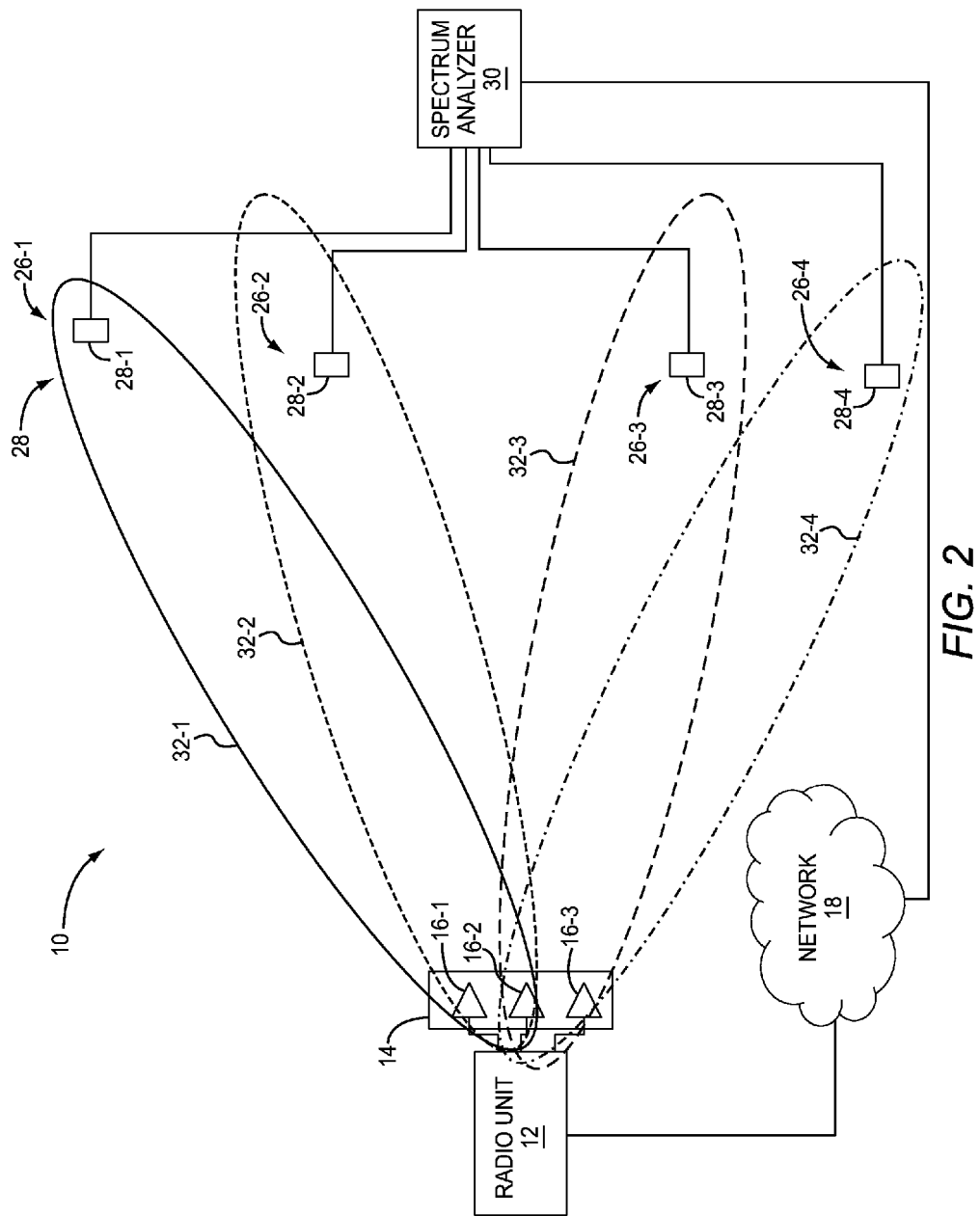
FIG. 2 is a block diagram of the system illustrated in FIG. 1, shown with additional components suitable for practicing one embodiment.

FIG. 2 is a block diagram of the system 10 illustrated in FIG. 1, shown with additional components suitable for practicing one embodiment. The system 10 includes one or more receivers 28-1-28-4 (generally, receivers 28). Each of the receivers 28-1-28-4 is at a respective location 26-1-26-4 (generally, locations 26) and includes a corresponding antenna capable of receiving signal transmissions from the antenna array 14. As discussed with respect to FIG. 1, a location 26 where a null 24 has been formed comprises an area, or volume, in which little or no energy is radiated by the antenna array 14 during certain signal transmissions by the antenna array 14, as will be described in greater detail herein. While for purposes of illustration only four receivers 28 are shown, any number of receivers 28 may be utilized in the embodiments.

The receivers 28 may be coupled to a spectrum analyzer 30, which may comprise any processing or computing device, including, for example, a digital receiver, that is suitable for analyzing the spectrum of signals received by a particular receiver 28 at a particular point in time. While not illustrated for purposes of clarity, additional components may be utilized, such as one or more switches, or, in other embodiments, the receivers 28 may comprise an integral spectrum analyzer 30. Thus, each receiver 28 may comprise both the receiver 28 and the spectrum analyzer 30. The spectrum analyzer 30 is coupled to the radio unit 12 via one or more networks 18.

Figure 3:
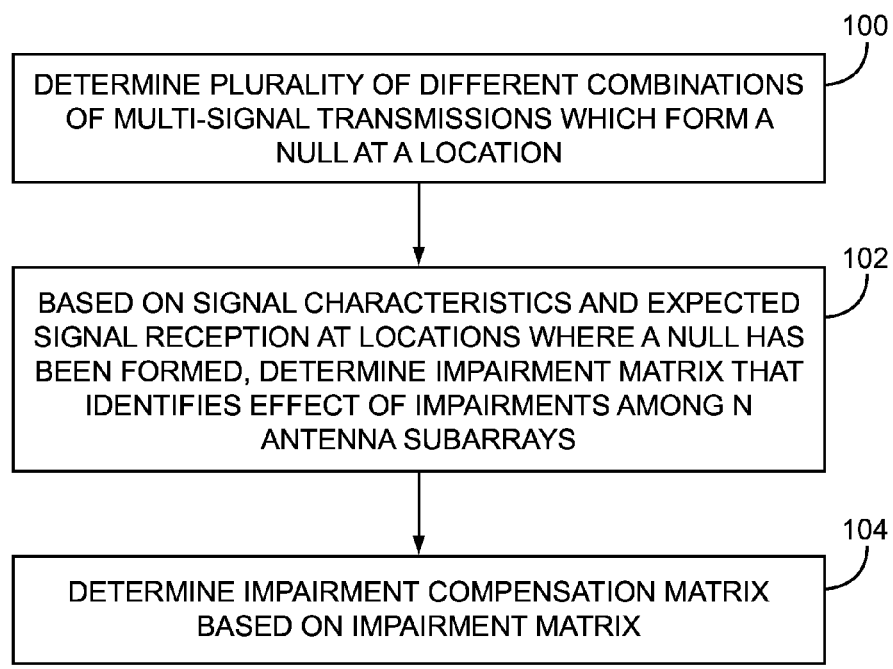
FIG. 3 is a flowchart illustrating a method for determining an impairment compensation matrix for an antenna array according to one embodiment.

FIG. 3 is a flowchart illustrating a method for determining an impairment compensation matrix for the antenna array 14 according to one embodiment, and will be discussed in conjunction with FIG. 2. In this embodiment, the antenna array 14 comprises antenna subarrays 16-1-16-3 (generally, antenna subarrays 16), and thus the number N of antenna subarrays 16 is three. However, the embodiments are not limited to any particular number of antenna subarrays 16 and have applicability to any number of antenna subarrays 16, wherein the number N is two or more.

The radio unit 12 determines a plurality of different combinations 32-1-32-4 (generally, combinations 32) of multi-signal transmissions, which form a null 24 at least one location 26 of the plurality of locations 26-1-26-4 (FIG. 3, block 100). Each combination 32 comprises a multi-signal transmission that includes at least two concurrent signal transmissions from at least two antenna subarrays 16 of N (e.g. in this example, N=3) antenna subarrays 16. For example, the combination 32-1 includes two concurrent signal transmissions from the antenna subarrays 16-1, 16-2. Similarly, the combination 32-3 includes two concurrent signal transmissions from the antenna subarrays 16-2, 16-3. The at least two concurrent signal transmissions have associated signal characteristics. Thus, with respect to the combination 32-1 for example, the signal transmission from the antenna subarray 16-1 has certain associated signal characteristics, such as for example, a particular magnitude and phase. Similarly, the concurrent signal transmission from the antenna subarray 16-2 has certain associated signal characteristics, such as for example, a particular magnitude and phase. The signal characteristics associated with the signal transmission from the antenna subarray 16-1 may differ from the signal characteristics associated with the concurrent signal transmission from the antenna subarray 16-2.

Each combination 32 also includes at least one respective location 26 where a null has been formed. Thus, the combination 32 includes at least two concurrent signal transmissions from the two antenna subarrays 16-1, 16-2, and the location 26-1. Similarly, the combination 32-4 includes concurrent signal transmissions from the antenna subarray 16-2, 16-3, and the location 26-4 where a null has been formed.

Based on the signal characteristics associated with the plurality of different combinations 32 of multi-signal transmissions from the antenna subarrays 16 and an expected signal reception by the receivers 28 at the respective locations 26 where a null has been formed, an impairment matrix that identifies an effect of impairments among the N antenna subarrays 16 is determined (FIG. 3, block 102). An impairment compensation matrix is then determined based on the impairment matrix (FIG. 3, block 104).

While for purposes of illustration only four combinations 32 are illustrated, as will be discussed in greater detail herein, preferably a sufficient number of combinations 32 are determined such that a sufficient number of linear equations may be derived to determine the impairment matrix. In embodiments wherein a calibration of the antenna arrays 14 is unknown, the number of different combinations 32 should be sufficient to derive at least $N^2$ different combinations 32. In the example illustrated in FIG. 2, if calibration of the antenna array 14 is unknown, it is desirable to determine a number of combinations 32 sufficient to derive nine $((N=3)^2)$ linear equations. In embodiments wherein the calibration of the antenna array 14 has been performed, then the number of different combinations 32 should be sufficient to derive $N^2-N$ different linear equations. Thus, for the example illustrated in FIG. 2, if calibration of the antenna arrays 14 has been performed, a sufficient number of combinations 32 should be determined to derive six $((N=3)^2-N)$ linear equations.

In one embodiment, the radio unit 12 may alter the signal characteristics of the concurrent signal transmissions until a null 24 is formed at a particular location 26. The radio unit 12 may alter the signal characteristics of such concurrent signal transmissions in response to information received from the spectrum analyzer 30. In particular, the spectrum analyzer 30 may in real time provide the radio unit 12 with information identifying an amount of energy received by a receiver 28 at a respective location 26. In response to such information, the radio unit 12 may alter the signal characteristics until the feedback from the particular receiver 28 indicates that a null 24 has been formed at the respective location 26.

While for purposes of illustration each combination 32 is illustrated as comprising two antenna subarrays 16 of the N=3 antenna subarrays 16, and a single location 26 where a null 24 has been formed, in other embodiments, a combination 32 may comprise any number of N antenna subarrays 16 wherein N equals at least two, and any number of locations 26 where nulls 24 have been formed by the concurrent signal transmissions.

Figure 4:
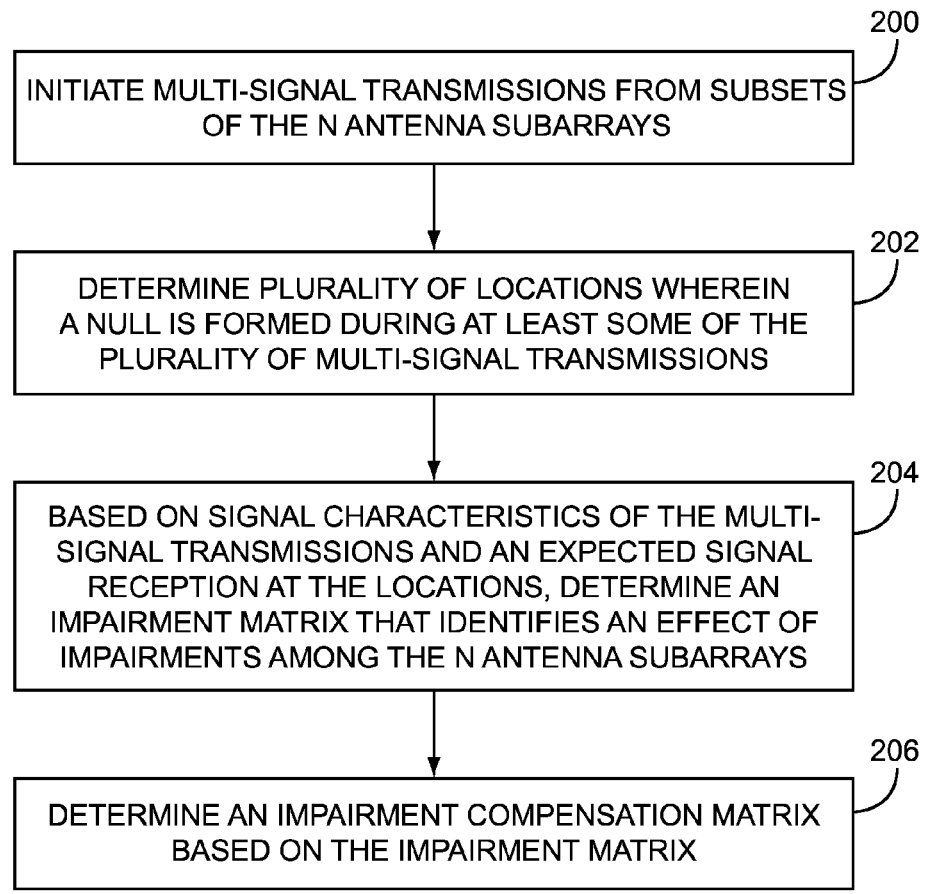
FIG. 4 is a flowchart illustrating a method for determining an impairment compensation matrix for an antenna array according to one embodiment.

FIG. 4 is a flowchart illustrating another way of describing a method for determining an impairment compensation matrix for the antenna array 14 according to one embodiment. FIG. 4 will be discussed in conjunction with FIG. 2. The radio unit 12 initiates a plurality of multi-signal transmissions from subsets of the N=3 antenna subarrays 16. Thus, for example, a combination 32 illustrates multi-signal transmissions from a subset of the N=3 antenna subarrays 16 comprising the antenna subarrays 16-1, 16-2 (FIG. 4, block 200). The combination 32-4 identifies multi-signal transmissions from a subset of the N antenna subarrays 16 comprising the antenna subarrays 16-2, 16-3. Each multi-signal transmission comprises a concurrent transmission of a signal from each antenna subarray 16 in the subset. Each signal has signal characteristics comprising at least a particular phase and magnitude.

The radio unit 12 determines a plurality of locations 26 wherein a null 24 is formed during at least some of the plurality of multi-signal transmissions (FIG. 4, block 202). Based on the signal characteristics of the multi-signal transmissions and an expected signal reception at the locations 26, the radio unit 12 determines an impairment matrix that identifies an effect of impairments among the N=3 antenna subarrays 16. The radio unit 12 then determines the impairment compensation matrix based on the impairment matrix (FIG. 4, block 206).

Referring again to FIG. 2, while for purposes of illustration four receivers 28 are shown, in other embodiments a single receiver 28 that is moved from one location 26 to another location 26 may be utilized. For example, a vehicle that includes a receiver 28 may, over a period of time, move from one location to another location in order to measure signals at different locations 26 where nulls 24 may be formed.

According to one embodiment, information derived from the combinations 32 (FIG. 2), in combination with additional information, may be used to derive linear equations, which, when solved, define an impairment matrix that identifies the effect of impairments among the N antenna subarrays 16. This process will be described with regard to FIG. 5.

Figure 5:
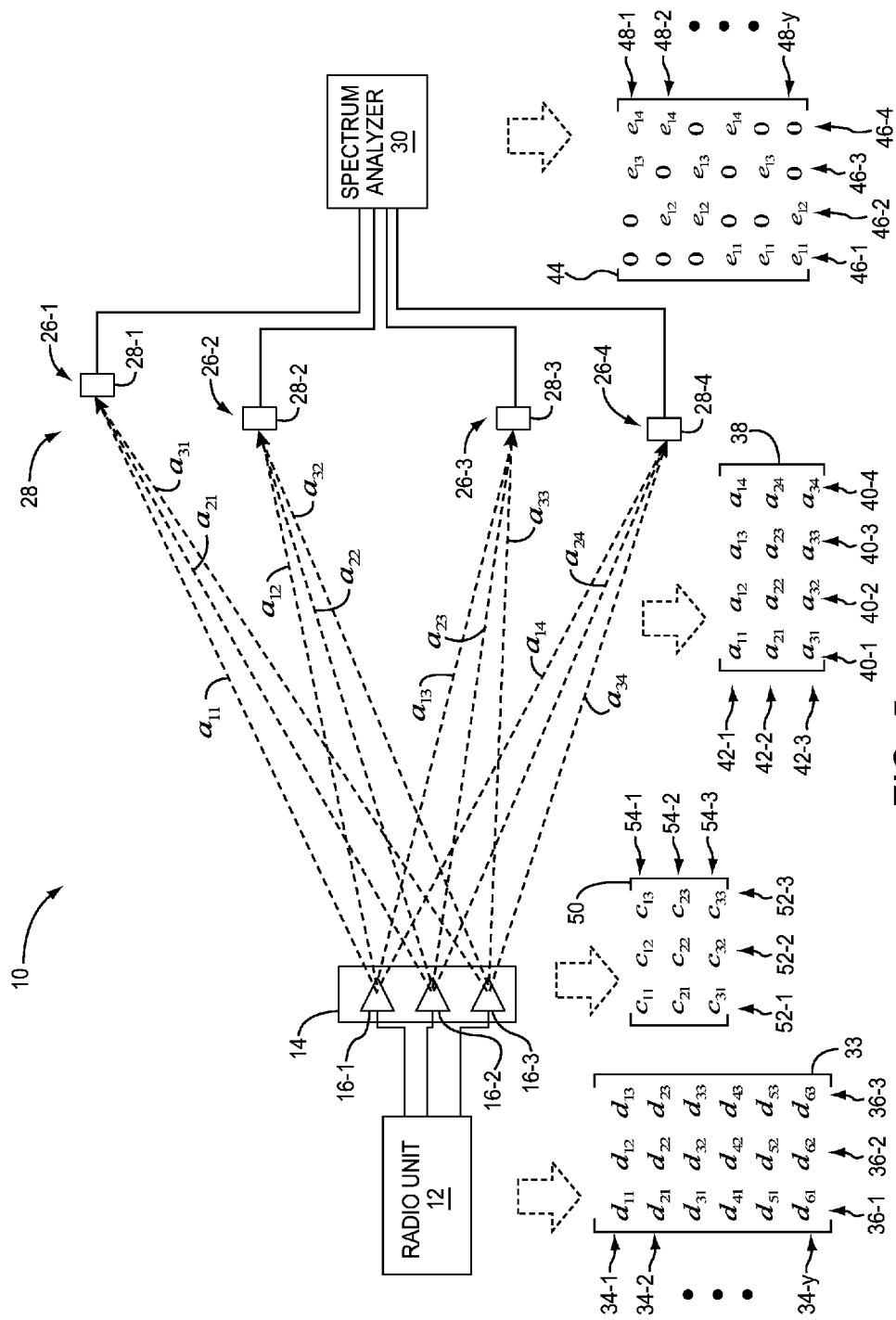
FIG. 5 is a block diagram of the system illustrated in FIG. 1 illustrating the generation of a plurality of different matrices according to one embodiment.

FIG. 5 is a block diagram of the system 10 illustrating the generation of a plurality of different matrices according to one embodiment. After the determination of a suitable number of combinations 32, the radio unit 12 determines, or otherwise derives, a transmit signal matrix 33 based on the signal characteristics associated with the concurrent signal transmissions of the combinations 32. In particular, the transmit signal matrix 33 comprises a plurality of rows 34-1-34-Y (generally, rows 34) wherein "Y" is the number of different combinations 32. Each row 34 comprises a column 36 that corresponds to a respective antenna subarray 16 of a particular combination 32. In contrast to the examples illustrated in FIG. 2, the combination 32 identified in the transmit signal matrix 33 comprises concurrent signal transmissions from N=3 subarrays 16, and thus, the transmit signal matrix 33 comprises three columns 36-1-36-3. As will be discussed in greater detail herein, each combination also includes the concurrent formation of nulls 24 at two different locations 26. The elements, or terms, in the transmit signal matrix 33 represent the signal characteristics associated with each signal transmission in a respective combination 32 and may be referred to herein as "signal elements." The signal elements may comprise, for example, complex coefficients, sometimes referred to as 'weights,' with which the respective signals are multiplied. For example, the row 34-1 comprises signal elements $d_{11}$, $d_{12}$, and $d_{13}$. The signal element $d_{11}$ identifies the signal characteristics of the signal transmitted from the antenna subarray 16-1. Thus, in one embodiment, the signal element $d_{11}$ comprises a complex coefficient with which the respective signal is multiplied. As discussed above, such signal characteristics comprise at least a particular phase and magnitude. The signal element $d_{12}$ identifies the signal characteristics of the concurrently transmitting signal from the antenna subarray 16-2. The signal element $d_{13}$ identifies the signal characteristics of the concurrently transmitting signal from the antenna subarray 16-3. Thus, collectively, the transmit signal matrix 33 identifies the signal characteristics of each signal transmission from the antenna 16 for each of six different combinations 32. To determine the values of the signal elements, the radio unit 12 may iteratively alter the signal characteristics associated with the concurrent signal transmissions in the combinations 32 until the spectrum analyzer 30 identifies that one or more nulls 24 have been formed at the locations 26. Upon such identification from the spectrum analyzer 30, the radio unit 12 determines the respective combination 32 and inserts a row 34 into the transmit signal matrix 33 identifying the signal characteristics of the concurrent signal transmissions associated with the respective combination 32.

A propagation matrix 38 identifies the expected signal transfer function between each antenna subarray 16 and an antenna at each location 26 where a null 24 has been formed. The elements, or terms, of the propagation matrix 38 may be referred to herein as "propagation elements." When a respective receiver 28 is in the near field, the propagation elements are based on the angle between the particular antenna subarray 16 and the respective receiver 28 as well as the distance of the respective receiver 28 from the respective antenna subarray 16. The propagation matrix 38 comprises a column 40 that corresponds to each receiver 28. Thus, in this example, the propagation matrix 38 comprises four columns 40-1-40-4, each of which corresponds to a receiver 28-1-28-4, respectively. The propagation matrix 38 includes a row 42 for each antenna subarray 16. Thus, in this example, the propagation matrix 38 comprises three rows 42-1-42-3, which correspond respectively to antenna subarrays 16-1-16-3. Each propagation element in the propagation matrix 38 describes the expected signal transfer between a particular antenna subarray 16 and a particular receiver 28. Thus, for example, the propagation element $a_{11}$ identifies an expected signal transfer between the antenna subarray 16-1 and the receiver 28-1. The propagation element $a_{23}$ identifies an expected signal transfer between the antenna subarray 16-2 and the receiver 28-3. The propagation elements of the propagation matrix 38 preferably include the amplitude and phase relationship between the antenna subarrays 16 as well as the effect of polarization associated with the antenna subarrays 16 and the receivers 28.

A received signal matrix 44 identifies actual energy received at respective locations of the receivers 28 at the time combinations 32 are determined. The elements, or terms, of the received signal matrix 44 may be referred to herein as "received energy elements." The received energy elements quantify an amount of energy received at one or more locations 26 of the plurality of locations 26 during a particular combination 32. A value of zero indicates the formation of a null 24 at the respective location 26 during the particular combination 32. The received signal matrix 44 includes a column 46 for each location 26 of a receiver 28. Thus, in this example, the received signal matrix 44 includes four columns 46-1-46-4, which correspond respectively to locations 26-1-26-4 of the receivers 28. The received signal matrix 44 includes a row 48 for each combination 32. Thus, in this example, the received signal matrix 44 comprises six rows 48, which correspond to the six combinations 32 identified in the transmit signal matrix 33. Row 48-1 indicates that the combination of concurrent signal transmissions identified in row 34-1 resulted in the formation of nulls 24 at locations 26-1 and 26-2, while energy was received at locations 26-3 and 26-4. Row 48-2 indicates that the combination of concurrent signal transmissions identified in row 34-2 resulted in the formation of nulls 24 at locations 26-1 and 26-3, while energy was received at locations 26-2 and 26-4.

The information determined and identified in the transmit signal matrix 33, the propagation matrix 38, and the received signal matrix 44 may be used to determine an impairment matrix 50 that identifies the effect of impairments among the antenna subarrays 16 based on the following formula:

$$E = (DCA)$$

wherein E represents the received signal matrix 44, D represents the transmit signal matrix 33, C represents the impairment matrix 50, and A represents the propagation matrix 38. The elements, or terms, of the impairment matrix may be referred to herein as "impairment variables." After the combinations 32 are determined, the signal elements of the transmit signal matrix 33 are known, the propagation elements of the propagation matrix 38 are known, and the received energy elements of the received matrix 44 are known. The impairment variables of the impairment matrix 50 are unknown.

Generally, as described above, the signal elements of the transmit signal matrix 33 and the received energy elements of the received signal matrix 44 are determined based on measurements, and the propagation elements of the propagation matrix 38 are determined based on antenna geometry and the locations of the receivers 28 at which nulls 24 are formed. In one embodiment, a set of K linear equations wherein DCA is equal to a zero element of the received signal matrix 44 is derived.

For example, in the example illustrated in FIG. 5, wherein the received signal matrix 44 identifies the formation of twelve nulls 24 at the four locations 26, twelve linear equations in the following form may be derived:

$$d_{11}a_{11}c_{11} + d_{11}a_{21}c_{12} + d_{11}a_{31}c_{13} + d_{12}a_{11}c_{21} + d_{12}a_{21}c_{22} + \\ d_{12}a_{31}c_{23} + d_{13}a_{11}c_{31} + d_{13}a_{21}c_{32} + d_{13}a_{31}c_{33} = 0 \quad [1]$$

$$\vdots$$

$$d_{61}a_{14}c_{11} + d_{61}a_{24}c_{12} + d_{61}a_{34}c_{13} + d_{62}a_{14}c_{21} + d_{62}a_{24}c_{22} + \\ d_{62}a_{34}c_{23} + d_{63}a_{14}c_{31} + d_{63}a_{24}c_{32} + d_{63}a_{34}c_{33} = 0 \quad [12]$$

The set of linear equations may then be solved using, for example, a least mean square function or pseudo-inverse function to determine the values of the impairment variables of the impairment matrix 50.

While the example illustrated in FIG. 5 utilizes all N=3 antenna subarrays 16, the embodiments are not limited to any particular number of antenna subarrays 16. For example, in another example wherein combinations 32 comprise concurrent transmissions from only two antenna subarrays 16 of a total of N=3 antenna subarrays 16, the resultant transmit signal matrix 33 may comprise:

$$D = \begin{bmatrix} d_{11} & d_{12} & 0 \\ d_{21} & 0 & d_{23} \\ 0 & d_{32} & d_{33} \\ d_{41} & d_{42} & 0 \\ d_{51} & 0 & d_{53} \\ 0 & d_{62} & d_{63} \\ d_{71} & d_{72} & 0 \\ d_{81} & 0 & d_{83} \\ 0 & d_{92} & d_{93} \\ d_{101} & d_{102} & 0 \\ d_{111} & 0 & d_{113} \\ 0 & d_{122} & d_{123} \end{bmatrix}$$

wherein a signal element of zero indicates that a particular antenna subarray 16 was not concurrently transmitting a signal during the respective combination 32. Assuming again four receivers 28, a propagation matrix 38 may appear as the following:

$$A = \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix}$$

An example received signal matrix 44 may comprise the following:

$$E = \begin{bmatrix} 0 & e_{12} & e_{13} & e_{14} \\ 0 & e_{22} & e_{23} & e_{24} \\ 0 & e_{32} & e_{33} & e_{34} \\ e_{41} & 0 & e_{43} & e_{44} \\ e_{51} & 0 & e_{53} & e_{54} \\ e_{61} & 0 & e_{63} & e_{64} \\ e_{71} & e_{72} & 0 & e_{74} \\ e_{81} & e_{82} & 0 & e_{84} \\ e_{91} & e_{92} & 0 & e_{94} \\ e_{101} & e_{102} & e_{103} & 0 \\ e_{111} & e_{112} & e_{113} & 0 \\ e_{121} & e_{122} & e_{123} & 0 \end{bmatrix}$$

Notably in this example, a null 24 is formed at only a single location 26 for each combination 32. Similar to the process described with respect to FIG. 5, the impairment matrix 50 may then be determined by deriving linear equations based on the determined and known values associated with the received signal matrix 44, the propagation matrix 38, and the impairment matrix 50. Example linear equations may appear as follows:

$$d_{11}a_{11}c_{11} + d_{11}a_{21}c_{12} + d_{11}a_{31}c_{13} + \qquad [1]$$
$$d_{12}a_{11}c_{21} + d_{12}a_{21}c_{22} + d_{12}a_{31}c_{23} = 0$$

$$\vdots \qquad \vdots$$

$$d_{122}a_{14}c_{21} + d_{122}a_{24}c_{22} + d_{122}a_{34}c_{23} + \qquad [12]$$
$$d_{123}a_{14}c_{31} + d_{123}a_{24}c_{32} + d_{123}a_{34}c_{33} = 0$$

In one embodiment, an impairment compensation matrix may be determined based on the impairment matrix 50. The impairment compensation matrix may be determined by, for example, taking an inverse or a pseudo-inverse of the impairment matrix 50. In particular, by defining B as the normalized inverse coupling matrix, the diagonal terms ($B_{11}, B_{22}, \ldots$) are equal to 1. Therefore:

$$C^{-1} = CI = \begin{bmatrix} CI_{11} & CI_{12} & \ldots & CI_{1N} \\ CI_{21} & CI_{22} & \ldots & CI_{2N} \\ \vdots & \vdots & \ddots & \vdots \\ CI_{N1} & CI_{N2} & \ldots & CI_{NN} \end{bmatrix} = \begin{bmatrix} T_1 B_{11} & T_2 B_{12} & \ldots & T_N B_{1N} \\ T_1 B_{21} & T_2 B_{22} & \ldots & T_N B_{2N} \\ \vdots & \vdots & \ddots & \vdots \\ T_1 B_{N1} & T_2 B_{N2} & \ldots & T_N B_{NN} \end{bmatrix}$$

Thus, the calibration terms may be expressed as:

$$T = \begin{bmatrix} T_1 \\ T_2 \\ \vdots \\ T_N \end{bmatrix} = \begin{bmatrix} CI_{11} \\ CI_{22} \\ \vdots \\ CI_{NN} \end{bmatrix}$$

The impairment compensation matrix B may be illustrated as:

$$B = \begin{bmatrix} 1 & CI_{12}/CI_{22} & \ldots & CI_{1N}/CI_{NN} \\ CI_{21}/CI_{11} & 1 & \ldots & CI_{2N}/CI_{NN} \\ \vdots & \vdots & \ddots & \vdots \\ CI_{N1}/CI_{11} & CI_{N2}/CI_{22} & \ldots & 1 \end{bmatrix}$$

In practice, the input signal transmitted by the antenna array 14 may be multiplied by the compensation impairment matrix B and then further multiplied by the calibration vector T to correct for impairments, such as mutual coupling and to perform calibration, according to one embodiment.

Figure 6:
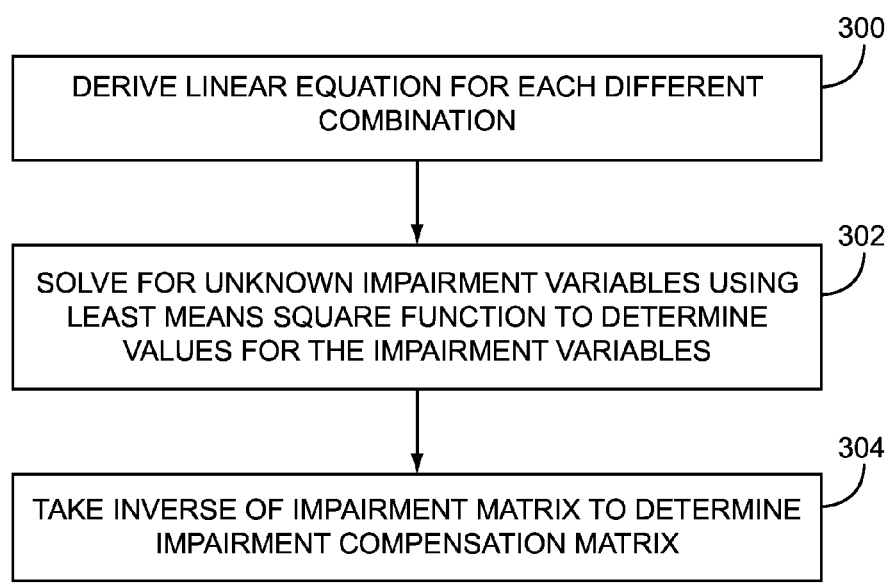
FIG. 6 is a flowchart illustrating steps from FIG. 3 in greater detail.

FIG. 6 is a flowchart illustrating steps 102-104 of FIG. 3 in greater detail. Linear equations are derived based on the different combinations 32 (FIG. 6, block 300). The linear equations are solved for the unknown impairment variables $C_{11}$-$C_{33}$ of the impairment matrix 50 using, for example, a least mean square function or pseudo-inverse function to determine values (FIG. 6, block 302). An inverse of the impairment matrix 50 may be taken to determine the impairment compensation matrix (FIG. 6, block 304).

Figure 7:
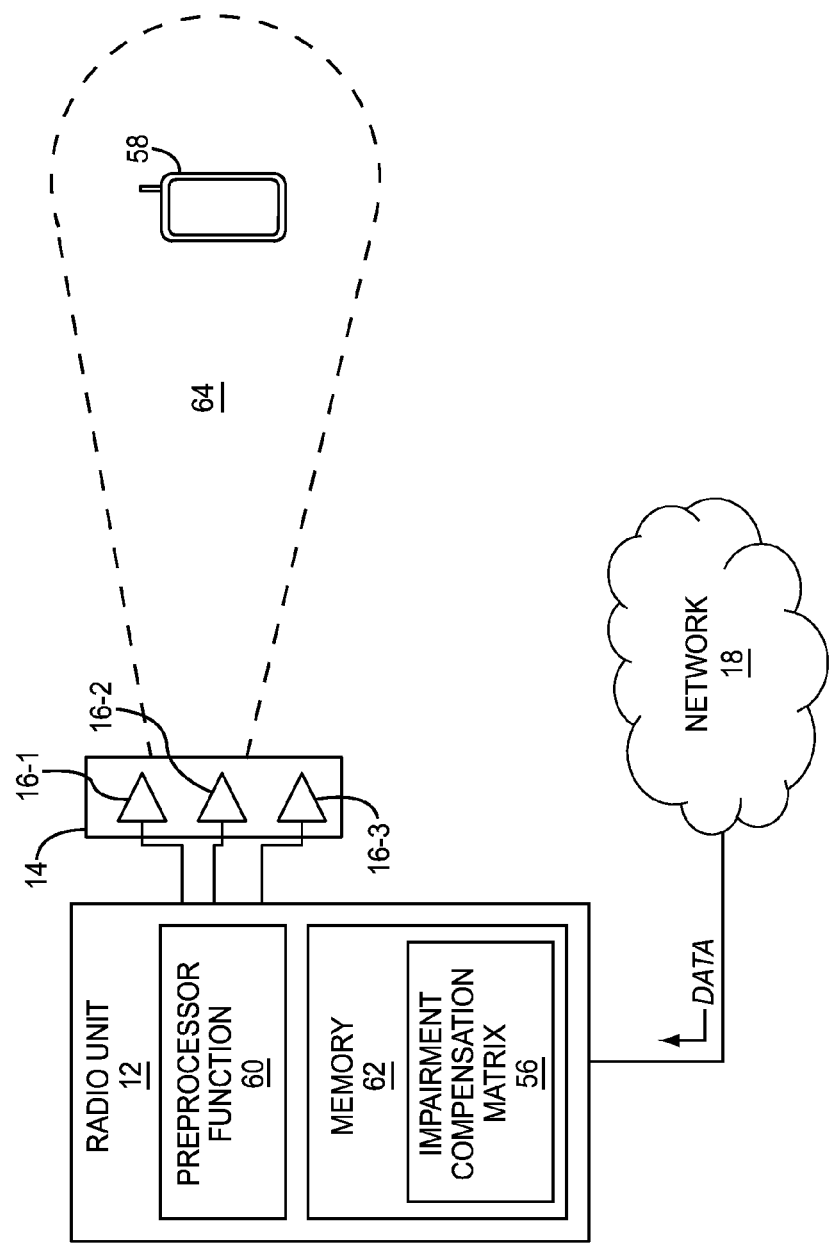
FIG. 7 is a block diagram illustrating the use of an impairment compensation matrix to preprocess signals prior to transmission to a mobile device.

FIG. 7 is a block diagram illustrating the use of an impairment compensation matrix 56 to preprocess signals prior to transmission to a mobile device 58. In this embodiment, the radio unit 12 includes a preprocessor function 60, which is communicatively coupled to a memory 62 in which the impairment compensation matrix 56 may be stored. As data arrives from the network 18 for transmission to the mobile device 58, the preprocessor function 60 processes the data based on the impairment compensation matrix 56 to compensate for the impairments of the antenna subarrays 16. The radio unit 12 then transmits the preprocessed signals through the antenna array 14 to form an appropriate antenna radiation pattern, such as one that includes a lobe 64, and is optimized for the mobile device 58 and may also account for other mobile devices.

Figure 8:
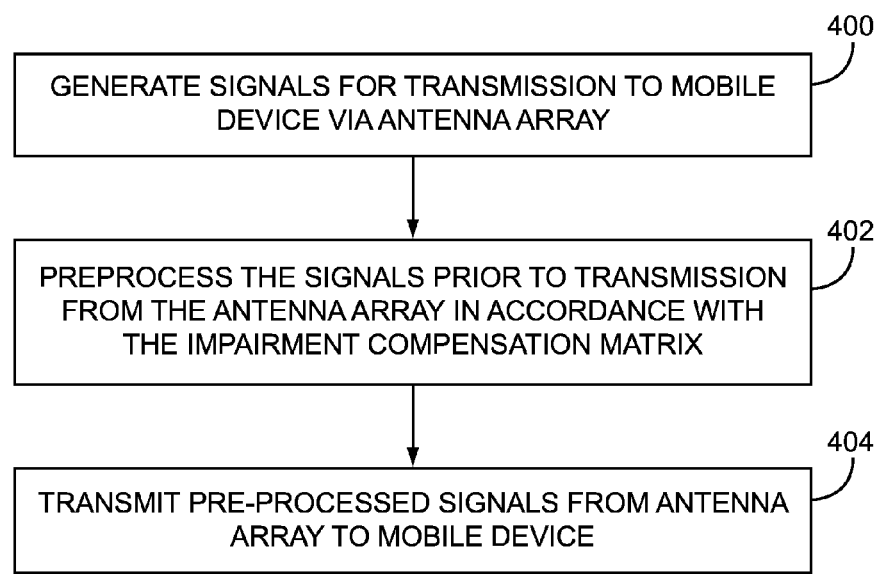
FIG. 8 is a flow chart illustrating a method for using an impairment compensation matrix according to one embodiment.

FIG. 8 is a flow chart illustrating a method for using an impairment compensation matrix 56 according to one embodiment, and will be discussed in conjunction with FIG. 7. The radio unit 12 receives the data via the network 18 for transmission to the mobile device 58. The radio unit 12 generates signals based on the data for transmission to the mobile device 58 via the antenna array 14 (FIG. 8, block 400). The radio unit 12 preprocesses the signals prior to transmission via the antenna array 14 in accordance with the impairment compensation matrix 56 (FIG. 8, block 402). The radio unit 12 then transmits the preprocessed signals concurrently via the antenna arrays 14 to the mobile device 58 (FIG. 8, block 404).

Figure 9:
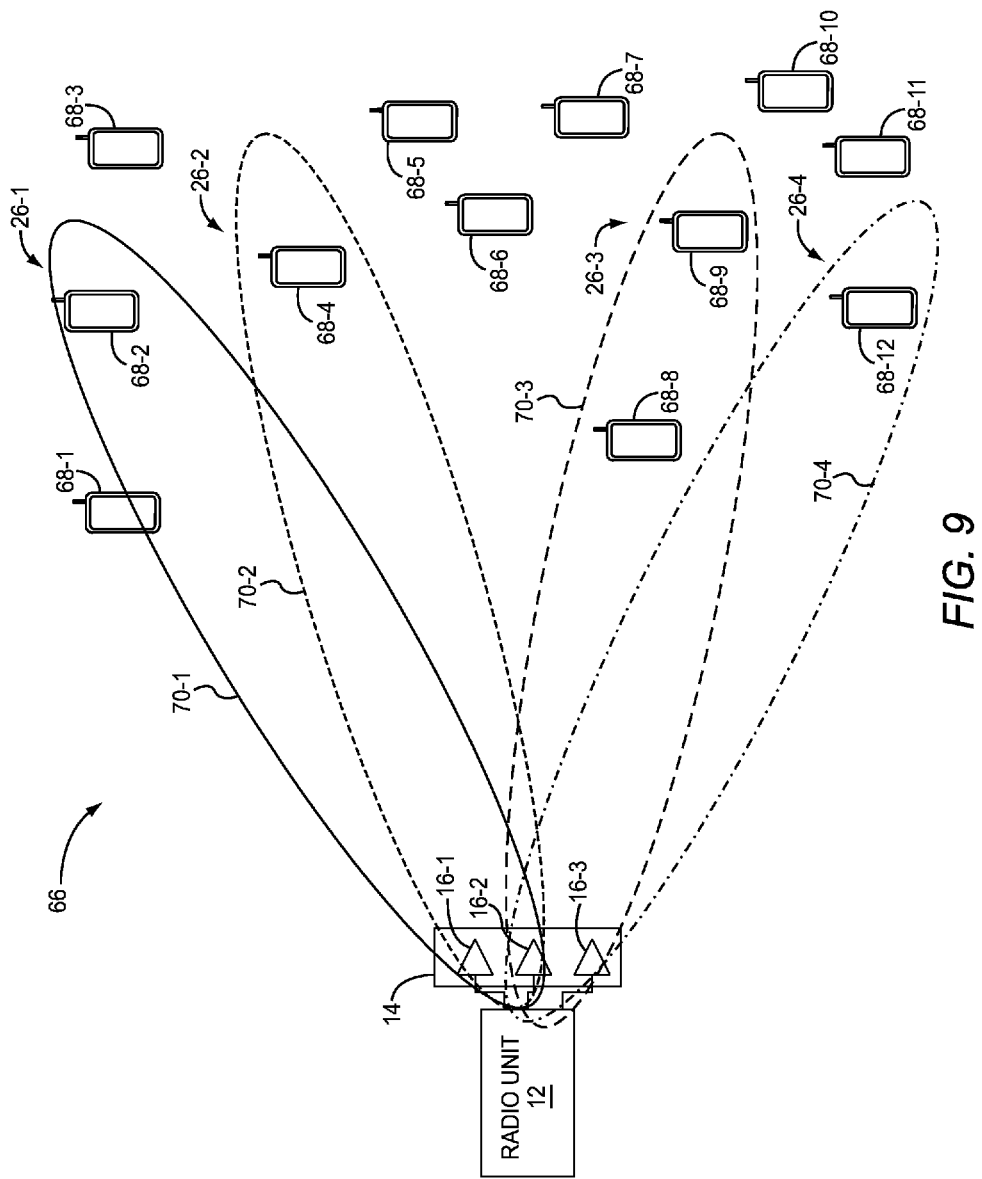
FIG. 9 is a block diagram of a system for determining an impairment compensation matrix according to another embodiment.

FIG. 9 is a block diagram of a system for determining an impairment compensation matrix according to another embodiment. In this embodiment, a system 66 includes the radio unit 12, which is communicatively coupled to the antenna array 14 which, in this example, comprises three antenna subarrays 16-1-16-3. In this embodiment, instead of receivers 28, mobile devices 68-1-68-12 (generally, mobile devices 68), such as those used by customers of a service provider that controls the radio unit 12, may be used to determine a plurality of combinations 70. Each combination 70 comprises a multi-signal transmission from the antenna array 14 that forms a null 24 at a respective location 26 of a plurality of locations 26. Thus, the combination 70-1 includes multi-signal transmissions from the antenna subarrays 16-1, 16-2 that form a null 24 at the location 26-1. Similarly, combination 70-4 comprises multi-signal transmissions from antenna subarrays 16-2, 16-3 that form a null 24 at the location 26-4. As discussed previously with respect to FIG. 5, a suitable number of combinations 70 are determined such that a suitable number of linear equations may be derived to determine a corresponding impairment matrix 50.

Figure 10:
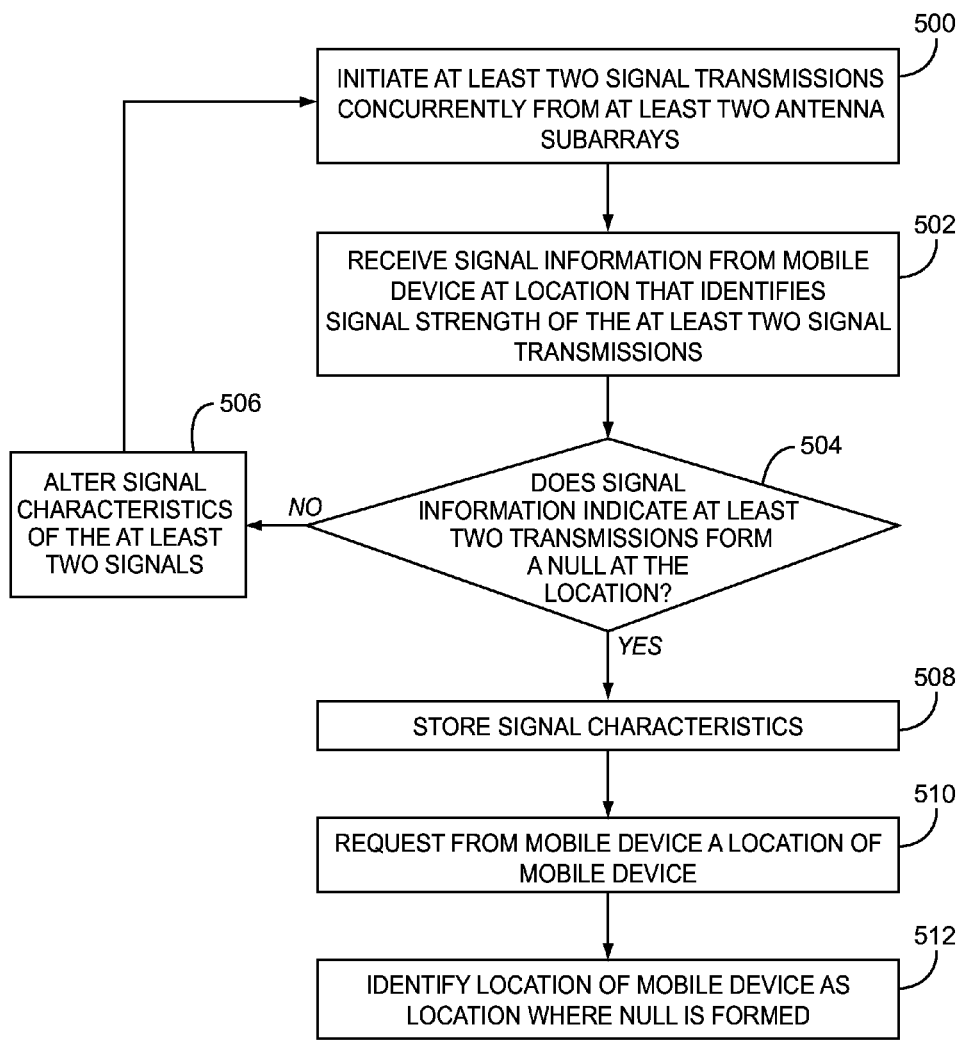
FIG. 10 is a flowchart illustrating a method for determining an impairment compensation matrix using mobile devices according to one embodiment.

FIG. 10 is a flowchart illustrating a method for determining an impairment compensation matrix using mobile devices according to one embodiment. FIG. 10 will be discussed in conjunction with FIG. 9. Initially, the radio unit 12 initiates at least two signal transmissions concurrently from at least two antenna subarrays 16-1-16-3 for receipt by a particular mobile device 68, such as the mobile device 68-1 (FIG. 10, block 500). For purposes of illustration, assume that at least two signal transmissions are initiated from antenna subarrays 16-1, 16-2. The radio unit 12 may then receive signal information from the mobile device 68-1 that identifies a signal strength of the at least two signal transmissions (FIG. 10, block 502). The radio unit 12 determines whether the signal information indicates that the at least two signal transmissions form a null 24 at the location 26 of the mobile device 68-1 (FIG. 10, block 504). If not, the radio unit 12 may alter signal characteristics of the at least two signals and initiate additional concurrent signal transmissions from the antenna subarrays 16-1, 16-2 (FIG. 10, blocks 506, 500). If at block 504 the radio unit 12 determines that the signal information indicates that the at least two signal transmissions form a null 24 at the location 26 of the mobile device 68-1, the radio unit 12 may store the signal characteristics associated with the at least two signal transmissions in the transmit signal matrix 33 (FIG. 10, block 508). The radio unit 12 may also request from mobile device 68-1 the location 26 of the mobile device 68-1 (FIG. 10, block 510). The radio unit 12 may then use the location 26 received from the mobile device 68-1 as the location where a null 24 has been formed in the combination 70-1 (FIG. 10, block 512).

This process may be repeated with a sufficient number of mobile devices 68 to form nulls 24 at a sufficient number of locations 26 in order to derive a sufficient number of independent linear equations, as discussed above. In this manner, an impairment compensation matrix may be determined during actual use of a system 66 by utilizing customer mobile devices 68.

In other embodiments, the radio unit 12 may first determine the location of the mobile device 68-1 prior to forming a null at the location of the mobile device 68-1. This may be desirable so that multiple mobile devices 68 are selected at sufficiently different locations that independent linear equations may be derived. In these embodiments, if the radio unit 12 determines that a mobile device 68 is not at a sufficiently different location from another mobile device 68 for which a null has been formed, the radio unit 12 will query other mobile devices 68 until one is identified as being at a sufficiently different location.

In another embodiment, an interference signal, which interferes with a reference signal $R_1$, may be transmitted via antenna subarrays 16. The reference signal $R_1$ may be reported by the mobile device 68-1 as having a degraded quality (e.g., via a channel quality index, for example) when the interference signal does not form a null 24 at the location 26 of the mobile device 68-1. This embodiment has the advantage that the signal is easier to generate and can be generated simply (constant tones for example) covering any desired bandwidth and when nulled will have no impact on the performance of the mobile device 68-1.

Figure 11:
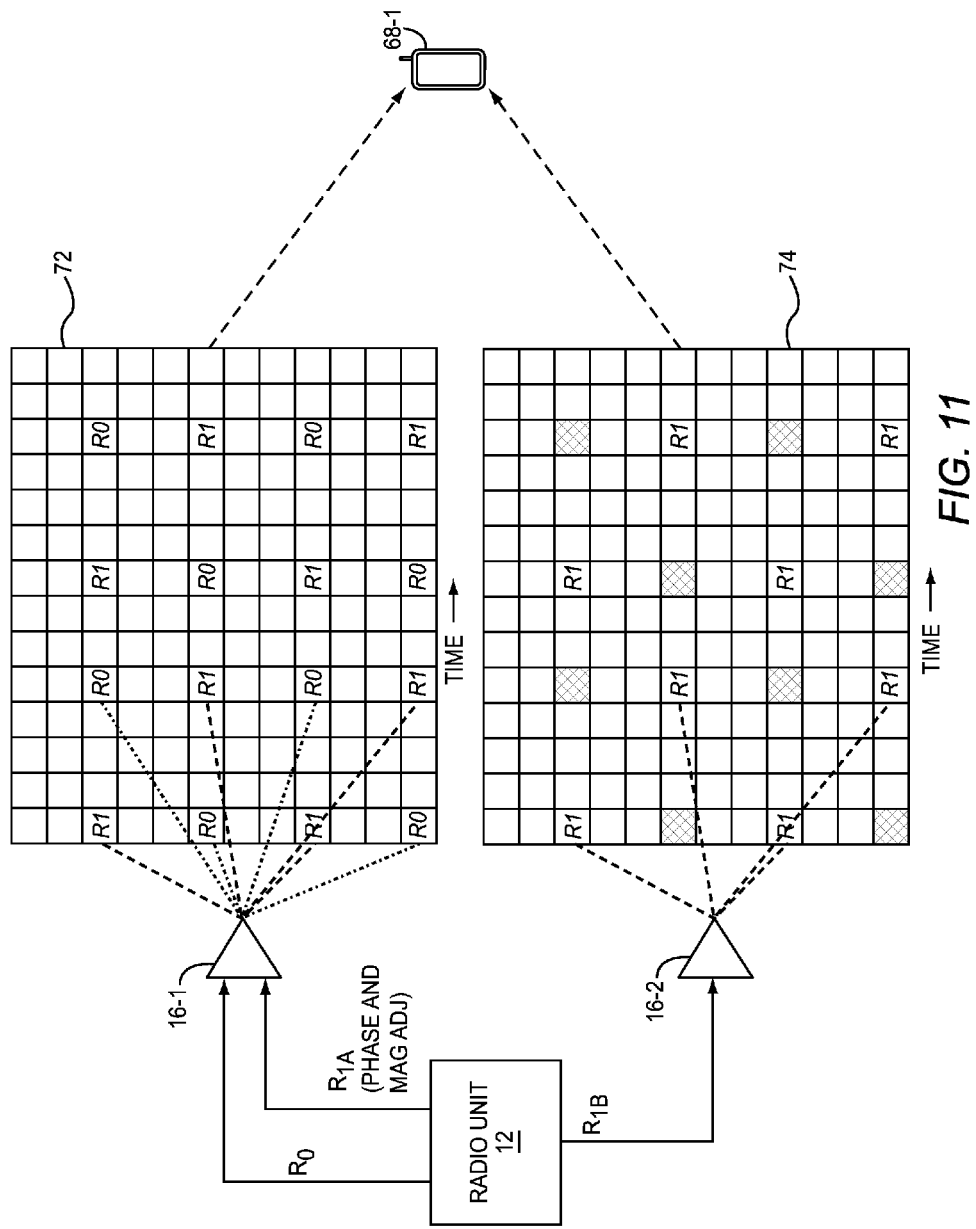
FIG. 11 is a block diagram illustrating concurrent signal transmission from a radio unit to a mobile device according to one embodiment.

FIG. 11 is a block diagram illustrating concurrent signal transmission from the radio unit 12 to the mobile device 68-1 as described in block 500 of FIG. 10, according to one embodiment. In this embodiment, the radio unit 12 generates a block 72 of information for transmission via the antenna subarray 16-1 and a second block 74 of information for transmission via the antenna subarray 16-2. The block 72 comprises two reference signals, denoted $R_{1A}$ and $R_0$. A reference signal $R_{1B}$ is also provided in the block 74. The reference signal $R_{1A}$ has an adjusted phase and/or magnitude compared to the phase and magnitude of the reference signal $R_{1B}$. The radio unit 12 concurrently transmits blocks 72 and 74 via the antenna subarrays 16-1 and 16-2 respectively. Mobile device 68-1 receives blocks 72 and 74 and combines the blocks 72 and 74. The radio unit 12 may then query the mobile device 68-1 and request signal information identifying the signal strength of the reference signals $R_1$ and $R_0$. The use of the two reference signals $R_0$ and $R_1$ can help the radio unit 12 distinguish between data loss due to fading and other effects, and a null 24 formed by phase and magnitude adjustment. For example, if the mobile device 68-1 reports strong reception of the reference signal $R_0$ and no reception of the reference signal $R_1$, the radio unit 12 may deduce that the reference signals $R_1$ formed a null 24 at the location 26 of the mobile device 68-1. The radio unit may then identify particular signal characteristics, such as the particular phases and magnitudes of the two reference signals $R_{1A}$ and $R_{1B}$ in the transmit signal matrix 33. This may be an iterative process such that over a period of time the radio unit 12 iteratively sends blocks 72 and 74 to the mobile device 68-1, each time altering the relative phases and/or magnitudes of the reference signals $R_{1A}$ and $R_{1B}$. After each iteration, the radio unit 12 requests information about the signal strengths of the reference signals $R_0$ and $R_1$ from the mobile device 62-1. These iterations may continue until the mobile device 68-1 reports that the reference signal $R_1$ is not received, and thus a null 24 has been formed at the location 26 of the mobile device 68-1.

Radiation characteristics of an antenna array 14 differ based on frequency. Accordingly, in one embodiment, the embodiments described herein may be performed for a number of different frequencies at which signals are commonly transmitted from the antenna array 14, resulting in the generation of a plurality of impairment compensation matrices. Thus, a plurality of different impairment compensation matrices, each different impairment compensation matrix corresponding to a different frequency within a bandwidth of the antenna array 14, may be determined using the mechanisms described herein. The radio unit 12 may select a particular impairment compensation matrix for use in pre-processing signals based on the respective frequency of that particular transmission.

Figure 12:
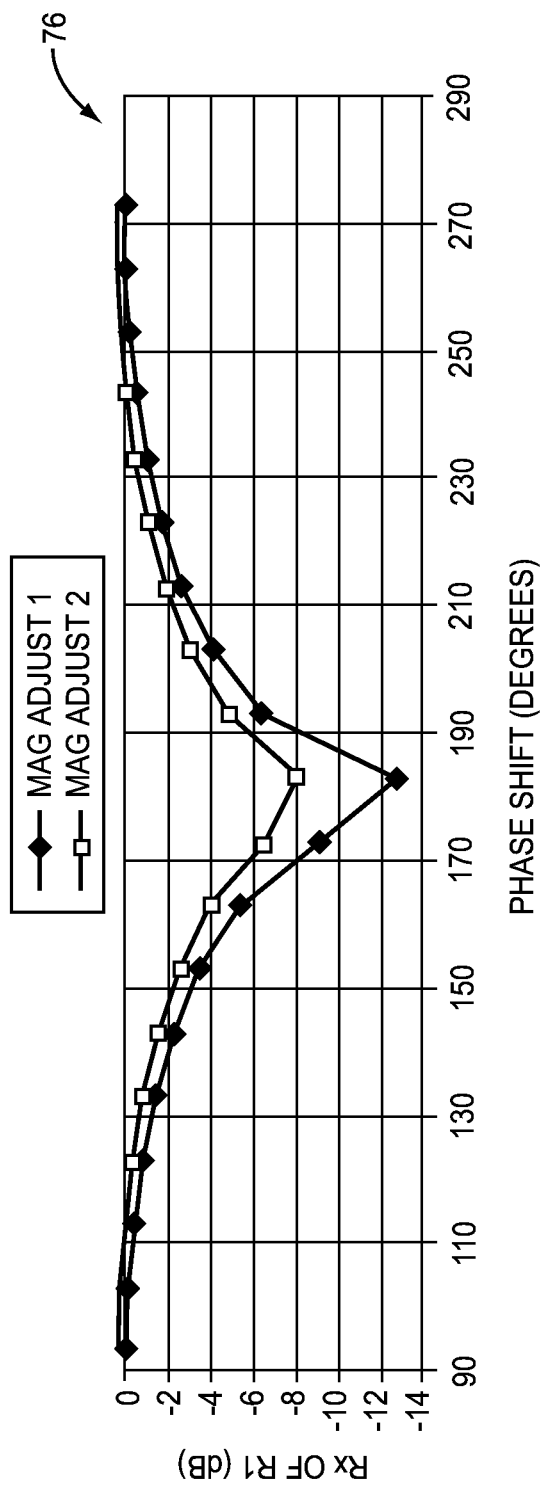
FIG. 12 is a graph illustrating an example iteration of magnitude and phase adjustments of a reference signal and how the effects of magnitude and phase adjustments may be perceived by a mobile device according to one embodiment.

FIG. 12 is a graph 76 illustrating an example iteration of magnitude and phase adjustments of the reference signal $R_{1A}$ with respect to $R_{1B}$ and how the effects of magnitude and phase adjustments may be perceived by the mobile device 68-1, according to one embodiment.

Figure 13:
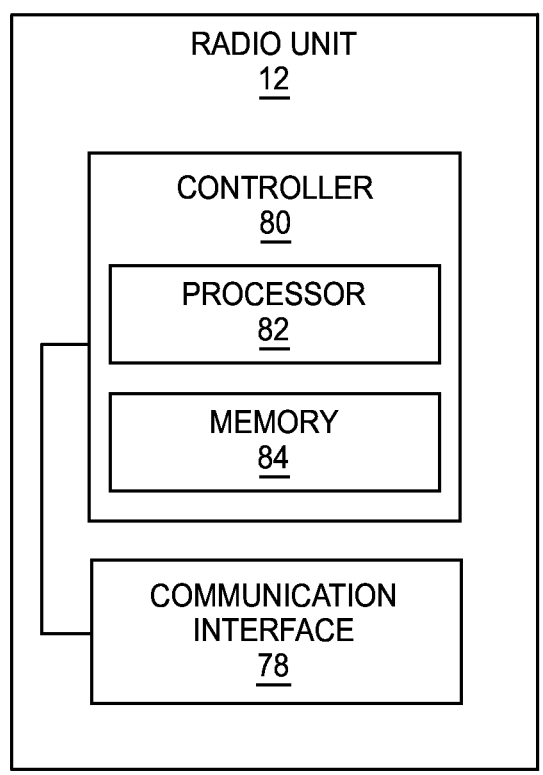
FIG. 13 is a block diagram of a radio unit suitable for implementing aspects of the embodiments disclosed herein.

FIG. 13 is a block diagram of the radio unit 12 suitable for implementing aspects of the embodiments disclosed herein. As discussed above, in the context of a LTE or LTE-A system, the radio unit 12 may comprise eNodeB controllers. In the context of a Wi-Fi® system, the radio unit 12 may comprise, for example, a WAP. The radio unit 12 includes a communications interface 78 and a controller 80. The communications interface 78 generally includes analog and/or digital components for sending and receiving communications to and from mobile devices within a wireless coverage area of the radio unit 12, as well as sending and receiving communications to and from other radio units 12, either directly or via the network 18. Those skilled in the art will appreciate that the block diagram of the radio unit 12 necessarily omits numerous features that are not necessary for a complete understanding of this disclosure.

Although all of the details of the controller 80 are not illustrated, the controller 80 comprises one or several general-purpose or special-purpose processors 82 or other microcontrollers programmed with suitable software programming instructions and/or firmware to carry out some or all of the functionality of the radio units 12 described herein. In addition, or alternatively, the controller 80 may comprise various digital hardware blocks (e.g., one or more Application Specific Integrated Circuits (ASICs), one or more off-the-shelf digital or analog hardware components, or a combination thereof) (not illustrated) configured to carry out some or all of the functionality of the radio units 12 described herein. A memory 84, such as a random access memory (RAM), may be used by the processor 82 to store data and programming instructions which, when executed by the processor 82, implement all or part of the functionality described herein. The radio unit 12 may also include one or more storage media (not illustrated) for storing data necessary and/or suitable for implementing the functionality described herein, as well as for storing the programming instructions which, when executed on the processor 82, implement all or part of the functionality described herein. One embodiment of the present disclosure may be implemented as a computer program product that is stored on a computer-readable storage medium, the computer program product including programming instructions that are configured to cause the processor 82 to carry out the steps described herein.

Among other advantages, the embodiments disclosed herein may increase system throughput by facilitating the formation of lobes and nulls where desired, and simplify and reduce the design time of antenna arrays. The embodiments may also provide greater freedom in the choice of element design to better optimize attributes such as cost, manufacturability, and repeatability of antenna arrays. The embodiments permit both antenna array calibration and other impairments, such as mutual coupling, to be compensated in a single process. The embodiments have applicability to a wide range of different antenna array types, including, by way of non-limiting example, planar antenna arrays and circular antenna arrays.

Those skilled in the art will recognize improvements and modifications to the preferred embodiments of the present disclosure. All such improvements and modifications are considered within the scope of the concepts disclosed herein and the claims that follow.

What is claimed is:

1. A method for determining an impairment compensation matrix for compensation of impairments in an antenna array comprising N antenna subarrays, comprising:
    determining a plurality of different combinations of multi-signal transmissions which form at least one null at a respective location of a plurality of locations, each different combination comprising:
    a multi-signal transmission that comprises at least two concurrent signal transmissions from at least two antenna subarrays of the N antenna subarrays, the at least two concurrent signal transmissions having associated signal characteristics; and
    the respective location;
    based on the signal characteristics associated with the plurality of different combinations of multi-signal transmissions and an expected signal reception at the plurality of locations, determining an impairment matrix that identifies an effect of impairments among the N antenna subarrays; and
    determining the impairment compensation matrix based on the impairment matrix.

2. The method of claim 1 wherein the signal characteristics comprise magnitude characteristics and phase characteristics, and wherein each signal transmission of the at least two concurrent signal transmissions have different associated magnitude and phase characteristics.

3. The method of claim 1 wherein the expected signal reception at the plurality of locations is defined by a propagation matrix that identifies expected signal transfer between each antenna subarray and an antenna at each location of the plurality of locations.

4. The method of claim 1 further comprising:
    generating at least two signals for concurrent transmission to a mobile device via the antenna array; and
    preprocessing the at least two signals prior to concurrent transmission via the antenna array in accordance with the impairment compensation matrix to form preprocessed signals.

5. The method of claim 1 wherein determining the impairment matrix that identifies the effect of impairments among the N antenna subarrays further comprises:
    deriving at least one linear equation for each different combination, each at least one linear equation comprising:
    signal elements that identify the signal characteristics associated with each different combination, the signal characteristics comprising a particular magnitude and a particular phase associated with each signal transmission of the at least two concurrent signal transmissions;
    propagation elements that identify an expected signal transfer between each of the at least two antenna subarrays and an antenna located at the respective location; and
    impairment variables that represent unknown impairment elements.

6. The method of claim 5 further comprising:
    deriving at least N2 independent linear equations based on the plurality of different combinations; and
    solving the impairment variables using one of a least mean square function and a pseudo-inverse function to determine the impairment variables, each impairment variable comprising an element in the impairment matrix.

7. The method of claim 6 wherein determining the impairment compensation matrix based on the impairment matrix comprises:
    taking an inverse or a pseudo-inverse of the impairment matrix to determine the impairment compensation matrix.

8. The method of claim 1 wherein determining the plurality of the different combinations further comprises:
    for each different combination:
    initiating the at least two concurrent signal transmissions from the at least two antenna subarrays; and
    receiving signal information from a mobile device at the respective location that indicates the at least two concurrent signal transmissions form a null at the respective location.

9. The method of claim 8 further comprising:
    requesting from the mobile device a location of the mobile device; and
    identifying the location of the mobile device as the respective location.

10. The method of claim 9 wherein initiating the at least two concurrent signal transmissions further comprises:
    sending a block of information to the mobile device, the block of information including a first reference signal generated by a single antenna subarray of the at least two antenna subarrays and a second reference signal generated by the at least two antenna subarrays.

11. The method of claim 1 wherein determining the plurality of different combinations further comprises:
    for at least some of the plurality of different combinations:
    initiating the at least two concurrent signal transmissions from the at least two antenna subarrays; and iteratively:
receiving signal information from a mobile device at the respective location that identifies a signal strength of the at least two concurrent signal transmissions; and
altering the associated signal characteristics of the at least two concurrent signal transmissions, until the signal information indicates the at least two concurrent signal transmissions form a null at the respective location.

12. The method of claim 1 wherein the respective location is defined in terms of an azimuth angle relative to a boresight of the antenna array and an antenna at which the at least one null is detected.

13. The method of claim 1, further comprising:
determining a plurality of different impairment compensation matrices, each different impairment compensation matrix corresponding to a different frequency within a bandwidth of the antenna array.

14. The method of claim 1 wherein the respective location is defined at least in part based on an elevation angle.

15. A method for determining an impairment compensation matrix for compensation of impairments in an antenna array comprising N antenna subarrays, comprising:
initiating a plurality of multi-signal transmissions from subsets of the N antenna subarrays, each multi-signal transmission comprising a concurrent transmission of a signal from each antenna subarray in the subset, each signal having signal characteristics comprising at least a particular magnitude and phase;
determining a plurality of locations within a signal reception area of the antenna array wherein a null is formed during at least some of the plurality of multi-signal transmissions;
based on the signal characteristics of the multi-signal transmissions and an expected signal reception at the plurality of locations, determining an impairment matrix that identifies an effect of impairments between the N antenna subarrays; and
determining the impairment compensation matrix based on the impairment matrix.

16. A method for determining an impairment compensation matrix for compensation of impairments in an antenna array comprising N antenna subarrays, comprising:
determining a plurality of different null-forming multi-signal transmissions, each null-forming multi-signal transmission comprising:
concurrent signal transmissions from at least two antenna subarrays of the N antenna subarrays that form a null at a location of a plurality of locations; and
based on signal characteristics associated with the plurality of different null-forming multi-signal transmissions and an expected signal reception at the plurality of locations, determining an impairment matrix that identifies an effect of impairments among the N antenna subarrays; and
determining the impairment compensation matrix based on the impairment matrix.

17. A device comprising:
a plurality of antenna ports, each antenna port configured to communicate with an antenna subarray of an antenna array;
a controller comprising a processor and communicatively coupled to the plurality of antenna ports, the controller configured to:
determine a plurality of different combinations of multi-signal transmissions which form at least one null at a respective location of a plurality of locations, each different combination comprising:
a multi-signal transmission that comprises at least two concurrent signal transmissions from at least two antenna subarrays of the N antenna subarrays, the at least two concurrent signal transmissions having associated signal characteristics; and
the respective location;
based on the signal characteristics associated with the plurality of different combinations of multi-signal transmissions and an expected signal reception at the plurality of locations, determine an impairment matrix that identifies an effect of impairments among the N antenna subarrays; and
determine the impairment compensation matrix based on the impairment matrix.

18. The device of claim 17 wherein the processor is further configured to:
generate signals for transmission to a mobile device via the antenna array; and
preprocess the signals prior to transmission via the antenna array in accordance with the impairment compensation matrix to form preprocessed signals.

19. The device of claim 17 wherein to determine the impairment matrix that identifies the effect of impairments among the N antenna subarrays, the controller is further configured to:
derive a linear equation for each different combination, each linear equation comprising:
signal elements that identify a particular magnitude and a particular phase associated with each signal transmission of the at least two concurrent signal transmissions of the different combination;
propagation elements that identify an expected signal reception between each of the at least two antenna subarrays and an antenna located at the respective location; and
impairment variables that represent unknown impairment elements.

20. The device of claim 19 wherein the controller is further configured to:
derive at least $N^2$ independent linear equations based on the plurality of different combinations; and
solve for the unknown impairment variables using one of a least mean square function and a pseudo-inverse function to determine the impairment variables, each impairment variable comprising an element in the impairment matrix.

21. The method of claim 1, wherein at least one of the N antenna subarrays comprises at least two antenna elements, and each of the at least two antenna elements receive the same signal transmission of the at least two concurrent signal transmissions for transmission.

* * * * *

UNITED STATES PATENT AND TRADEMARK OFFICE
CERTIFICATE OF CORRECTION

PATENT NO.        : 9,287,620 B2                                  Page 1 of 1
APPLICATION NO.   : 13/765046
DATED             : March 15, 2016
INVENTOR(S)       : McGowan et al.

It is certified that error appears in the above-identified patent and that said Letters Patent is hereby corrected as shown below:

On the Title Page, Item (73), under "Assignee", in Column 1, Line 1, delete "Optics Cellular" and insert -- Optis Cellular --, therefor.

In the Specification

In Column 6, Line 32, delete "at least" and insert -- at at least --, therefor.

In the Claims

In Column 16, Line 30, in Claim 6, delete "at least N2" and insert -- at least $N^2$ --, therefor.

In Column 18, Line 47, in Claim 20, delete "at least N2" and insert -- at least $N^2$ --, therefor.

Signed and Sealed this
Thirty-first Day of May, 2016

Michelle K. Lee
*Director of the United States Patent and Trademark Office*